United States Patent
Larsson et al.

(10) Patent No.: US 7,817,819 B1
(45) Date of Patent: Oct. 19, 2010

(54) CHARACTERIZATION OF METAL PARTICLE DISTRIBUTIONS IN A SUPPORTED CATALYST

(75) Inventors: Mats I. Larsson, Sunnyvale, CA (US); Juan Cai, Fremont, CA (US)

(73) Assignee: Nanostellar, Inc., Redwood City, CA (US)

( * ) Notice: Subject to any disclaimer, the term of this patent is extended or adjusted under 35 U.S.C. 154(b) by 866 days.

(21) Appl. No.: 11/696,035

(22) Filed: Apr. 3, 2007

(51) Int. Cl.
G06K 9/00 (2006.01)
B01J 23/00 (2006.01)

(52) U.S. Cl. ...................... 382/100; 502/300

(58) Field of Classification Search .............. 382/100, 382/252; 502/12, 35, 84, 100, 101, 102, 502/103, 185, 240, 300, 407, 514
See application file for complete search history.

(56) References Cited

U.S. PATENT DOCUMENTS

| | | | | |
|---|---|---|---|---|
| 5,153,158 | A * | 10/1992 | Kioka et al. | 502/126 |
| 6,458,741 | B1 * | 10/2002 | Roark et al. | 502/303 |
| 7,585,808 | B2 * | 9/2009 | Malek et al. | 502/300 |

\* cited by examiner

*Primary Examiner*—Abolfazl Tabatabai
(74) *Attorney, Agent, or Firm*—Patterson & Sheridan, LLP

(57) ABSTRACT

A catalyst sample may contain both small and large metal particle distributions simultaneously. Characterizing the properties of the metal particles contained in each distribution is important to help describe catalytic performance and optimize catalysts. Monte Carlo simulations and dispersion measurements are employed to determine the relationship between dispersion parameters of each metal particle distribution. Various properties, such as the atom fraction and the surface atom fraction of each distribution can be determined.

13 Claims, 6 Drawing Sheets

CHARACTERIZATION OF METAL PARTICLE DISTRIBUTIONS IN A SUPPORTED CATALYST

BACKGROUND OF THE INVENTION

1. Field of the Invention

The present invention generally relates to catalyst characterization and, more particularly, to determining the large metal particle fraction in a heterogeneous catalyst.

2. Description of the Related Art

The performance of catalysts is highly dependent on their physical and chemical properties. However, it is often difficult to directly measure physical and chemical properties of supported metal particles in catalysts, especially catalysts whose average metal particle sizes are less than 100 nm, hereafter called "nanocatalysts." Catalyst developers therefore rely on sophisticated characterization techniques to determine the physical and chemical properties and performance characteristics of new catalyst designs.

Dispersion and metal particle size distribution influence the performance of catalysts. Dispersion D is defined according to $D=N_{Tot}^{S}/N_{Tot}$, where $N_{Tot}^{S}$ is total amount of metal surface atoms and $N_{Tot}$ is all metal atoms in the catalyst. Dispersion is an important property in catalysis because only atoms that are exposed to the surface are able to play a role in catalytic surface reactions. Catalyst metal particle size is also an important property because larger metal particles have less percentage of their atoms at the surface. As a consequence, a catalyst with smaller metal particles will usually outperform an equivalent amount of catalyst with identical metal concentration, but having larger metal particles.

When a catalyst contains a combination of a large metal particle fraction and a small metal particle fraction, conventional characterization methods for determining catalyst dispersion and metal particle size may not work very well to adequately describe the properties of all metal particles in the sample. A catalyst can contain two distinct metal particle fractions for a variety of reasons. They may result from a particular synthesis method that was applied and/or how the initial distribution of metal particles on the support material is changed upon aging (e.g., hydro-thermal treatment, exposure to poisons, etc.). It would be possible to quantify the large metal particle fraction by imaging all of the metal particles in a catalyst sample and measuring the size of each one, but this process would be too slow and too expensive to be applied in practice.

SUMMARY OF THE INVENTION

Embodiments of the present invention provide an improved method for determining the nature of large metal particles in a heterogeneous catalyst. The improved method is more practical than the brute-force microscopic techniques described above because it relies on measurements that can be made more easily. With this ability to determine the nature of the large metal particle fraction in a catalyst, one can better quantify metal use efficiency in a catalyst sample and optimize the synthesis techniques to maximize performance.

A catalyst characterization method according to an embodiment of the present invention includes the steps of providing a catalyst having small and large metal particle size distributions ($P_1$ and $P_2$, respectively), estimating a dispersion of the $P_1$ metal particles ($D_1$); $D_1=N_1^{S}/N_1$, where $N_1^{S}$ is the number of surface atoms in $P_1$ and $N_1$ is the total number of atoms in $P_1$, estimating a total dispersion of the catalyst ($D_{Tot}$), and determining the atomic fractions of the $P_2$ metal particles, as well as the corresponding dispersion ($D_2$); $D_2=N_2^{S}/N_2$, where $N_2^{S}$ is the number of surface atoms in $P_2$ and $N_2$ is the total number of atoms in $P_2$. This determination is based on $D_1$ and $D_{Tot}$, where $D_1$ may be estimated from transmission electron microscopy (TEM) or scanning transmission electron microscopy (STEM) measured sizes of the $P_1$ metal particles and $D_{Tot}$ may be estimated from chemisorption measurements. If $D_1$ is not significantly different from $D_{Tot}$, within the accuracy of the experimental techniques used to determine them, the fraction of $P_2$ metal atoms in the catalyst sample is below the detection limit of the method or there is no large particle fraction.

A method for evaluating the effects of aging on a catalyst according to an embodiment of the present invention includes the steps of preparing a fresh catalyst sample and performing appropriate characterization methods. Thereafter, the nature of $P_2$ (i.e., properties or existence of) is determined based upon size measurements of the metal particles in the fresh catalyst sample and chemisorption measurements performed on the fresh catalyst sample. Subsequently, the fresh catalyst is subjected to aging and characterized by determining the nature of $P_2$ (i.e., properties or existence of) in the aged catalyst based on TEM or STEM size measurements of the metal particles in the aged catalyst sample and chemisorption measurements performed on the aged catalyst. The properties of $P_2$ in the fresh and aged catalyst samples are then compared to determine the aging effects.

Another embodiment of the present invention provides a computer-readable storage medium having stored thereon instructions to be executed in a computer system to determine a physical property of a catalyst. According to this embodiment, the instructions stored on the computer-readable storage medium cause the computer system to carry out the steps of calculating $D_1$ and $D_{Tot}$ of the catalyst, using these numbers to determine if there is a large metal particle fraction in the catalyst, and if so determining the properties of such a fraction.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
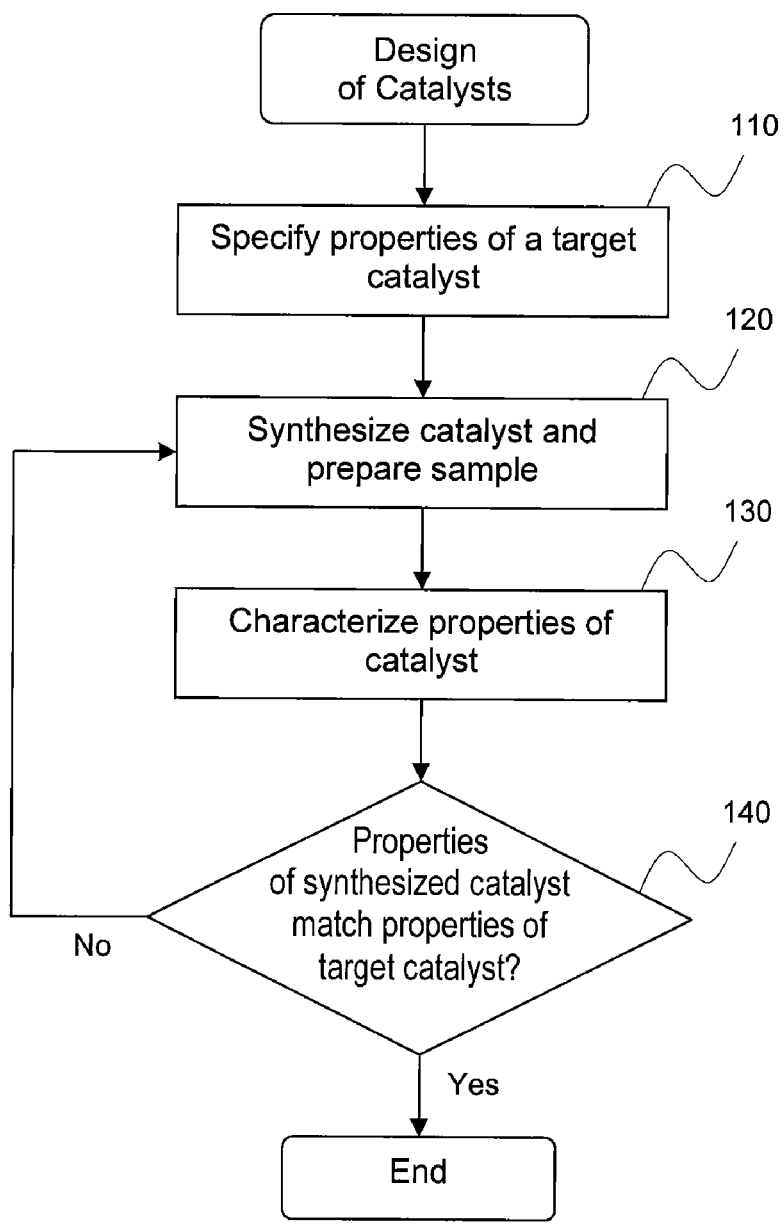
FIG. 1 is a flow diagram illustrating a design process for a catalyst in which embodiments of the present invention can be practiced.

FIG. 1 is a flow diagram illustrating the design process of catalysts in which embodiments of the present invention can be practiced. In step 110, the composition and the properties of a target catalyst are specified. The composition indicates the metal species and the support material. It also specifies the weight ratio of the metal species if it includes more than one metal species. The properties may include the metal particle size distribution. A catalyst with the target composition is then synthesized in step 120. In addition, a sample of the synthesized catalyst is prepared for subsequent characterization in step 130, where the properties of the catalyst sample are determined. Then, the properties of the target catalyst are compared against the properties of the synthesized catalyst in step 140. If there is a good match, the synthesized catalyst is accepted, and the process ends. If a match is not obtained within a given predetermined range of acceptable values, the process returns to step 120, where a catalyst with the target composition is synthesized according to a different synthesis method.

Figure 2:
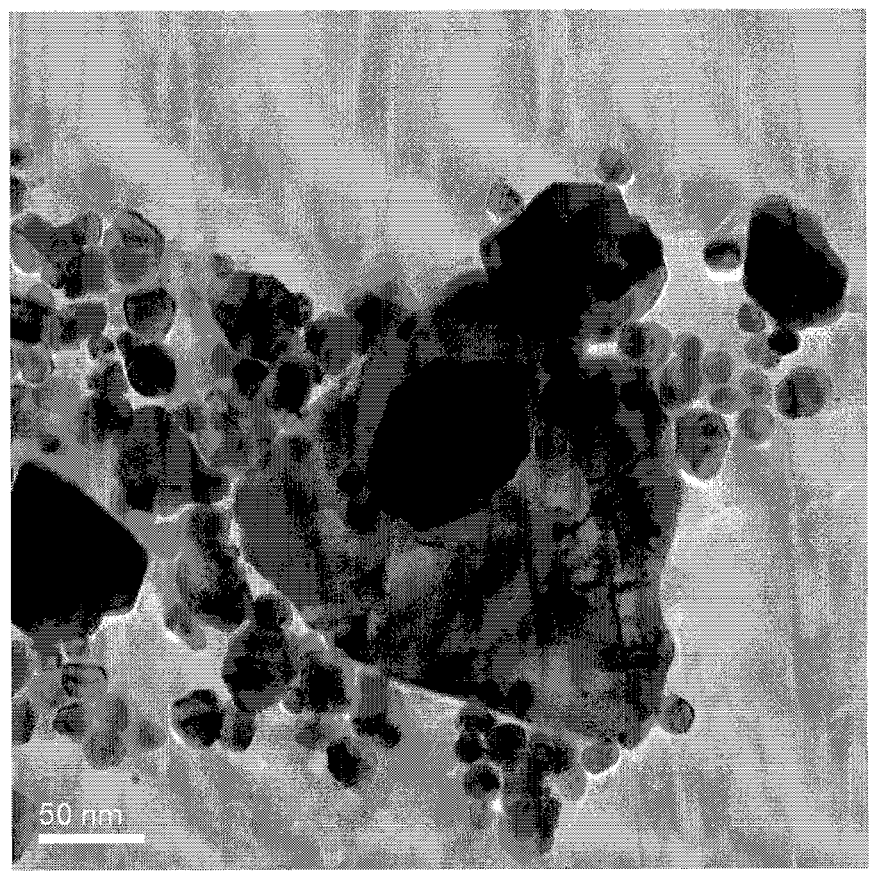
FIG. 2 is a TEM image of a catalyst sample that illustrates metal particles of various sizes.
Figure 3:
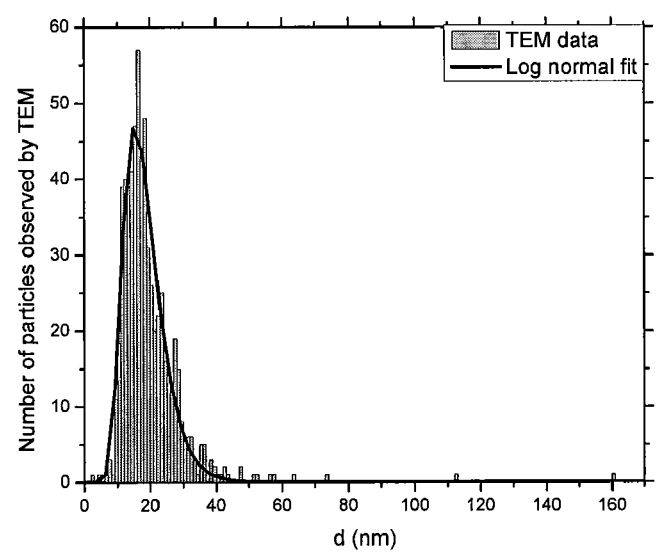
FIG. 3 graphically illustrates the size distribution of the catalyst sample shown in FIG. 2.

FIG. 2 is a TEM image of a catalyst sample that illustrates metal particles of various sizes. According to embodiments of the present invention, this system is modeled as two distinctly separated particle size distributions $P_1$ and $P_2$, where $P_1$ contains particles that are smaller than those in $P_2$. FIG. 3 is a graphical illustration of the catalyst sample of FIG. 2 having small metal particles belonging to $P_1$ and a few large metal particles belonging to $P_2$. $P_1$ can often be modeled with a log-normal distribution while $P_2$ is modeled as a stochastic distribution. The $P_2$ metal particles contain a disproportionately large number of bulk atoms and therefore may not contribute significantly to catalytic activity. The dispersion values corresponding to $P_1$ and $P_2$ are $D_1$ and $D_2$, respectively, and the dispersion value corresponding to all supported metal particles (i.e., $P_1+P_2$) is defined as $D_{Tot}$. Other properties of the catalyst sample that can be determined include: $N_2/N_{Tot}$, $N_1/N_{Tot}$, $N_2^S/N_{Tot}^S$, $N_1^S/N_{Tot}^S$, where $N_1$ represents the number of atoms in the $P_1$ metal particles and $N_2$ represents the number of atoms in the $P_2$ metal particles. $N_{Tot}$ is the sum of $N_1$ and $N_2$ and the superscript 'S' signify surface atoms. The derivation for $N_1/N_{Tot}$ and $N_1^S/N_{Tot}^S$ follow directly when $N_2/N_{Tot}$ and $N_2^S/N_{Tot}^S$ have been determined because $N_{Tot}=N_1+N_2$ and $N_{Tot}^S=N_1^S+N_2^S$.

If $N_{Tot}$ is known (easily calculated using the total amount of metal in the catalyst sample) the absolute numbers of $N_2$, $N_1$, $N_2^S$, $N_1^S$ and $N_{Tot}^S$ can be determined. For a given catalytic reaction rate $R_{Tot}$, the turnover frequency ($TOF_{Tot}$) can be calculated according to $TOF_{Tot}=R_{Tot}/N_{Tot}^S$. We can also define one turnover frequency for $P_1$: $TOF_1=R_1/N_1^S$ and one turnover frequency for $P_2$: $TOF_2=R_2/N_2^S$.

Figure 4:
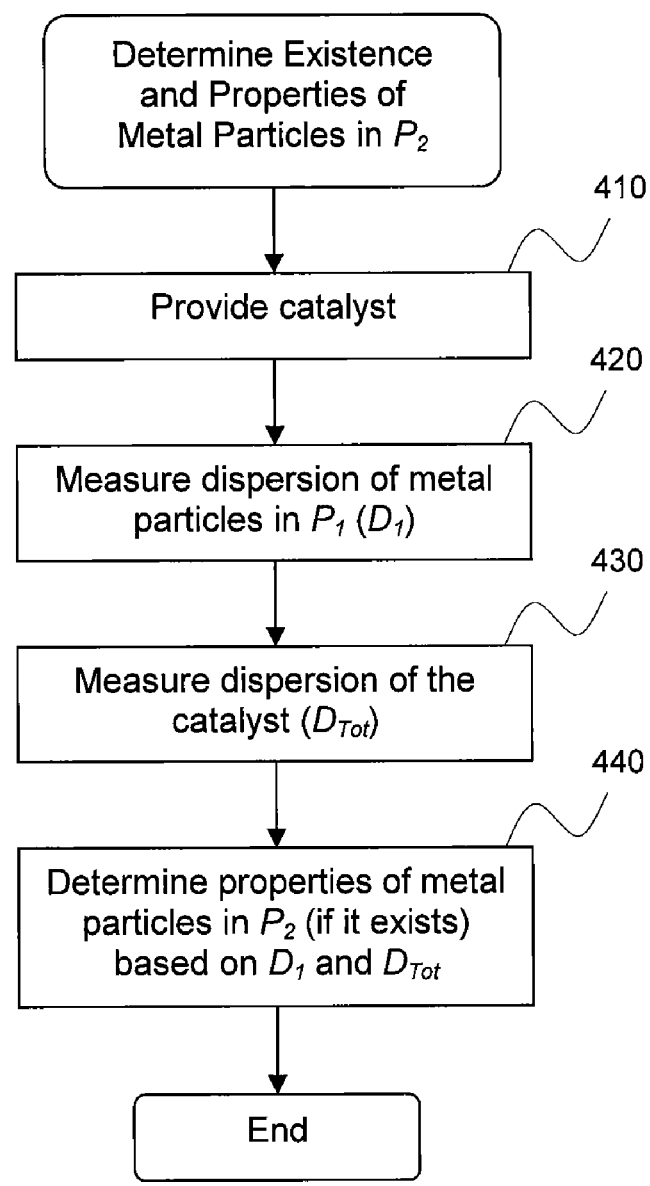
FIG. 4 is a flow diagram illustrating the steps carried out to determine properties of large metal particles in a catalyst.

FIG. 4 is a flow diagram illustrating the steps carried out to determine the properties of the large metal particle fraction in a catalyst (i.e., $P_2$). In step 410, a catalyst, e.g., the synthesized catalyst, is provided. A statistically valid sample size for TEM measurements is required for accurate characterization of $P_1$. It has been observed that about 1000 particles should be analyzed to obtain statistical validity. Then, the dispersion $D_1$ is estimated in step 420, and $D_{Tot}$ is estimated in step 430. In step 440, the atomic fraction of $P_2$ metal particles in the catalyst may be determined using the relationship:

$$\frac{N_2}{N_{Tot}} = \frac{D_1 - D_{Tot}}{D_1},$$

where the dispersion $D_2$ of the $P_2$ metal particles in the catalyst is assumed to be zero or in practice negligible compared to $D_1$. If $D_2$ is not assumed to be negligible compared to $D_1$, the following relationship is used:

$$\frac{N_2}{N_{Tot}} = \left(\frac{D_1 - D_{Tot}}{D_1}\right),$$

where $y_2$ is a correction factor based on a size range for $P_2$. This correction factor is determined through Monte Carlo simulations, as further described below. Hence, $N_2$ and $N_1$ are simply calculated by $$N_2 = N_{Tot} \times y_2 \times \left(\frac{D_1 - D_{Tot}}{D_1}\right)$$

and $N_1 = N_{Tot} - N_2$. When $y_2$ is determined, the dispersion $D_2$ for $P_2$ metal particles is determined by:

$$D_2 = \left(1 - \frac{1}{y_2}\right) \times D_1.$$

The ratio of the number of surface atoms of the $P_2$ metal particles, to the total number of surface metal atoms in the catalyst is determined by applying:

$$\frac{N_2^S}{N_{Tot}^S} = (y_2 - 1) \times \left(\frac{D_1}{D_{Tot}} - 1\right).$$

Thereafter, it is straightforward to calculate $N_{Tot}^S = D_{Tot} \times N_{Tot}$, $$N_2^S = N_2^S \times (y_2 - 1) \times \left(\frac{D_1}{D_{Tot}} - 1\right)$$

and $N_1^S = N_{Tot}^S - N_2^S$. Having determined all dependent variables, the numbers of core atoms: $N_{Tot}^S = N_{Tot}^S - N_{Tot}^S$, $N_1^C = N_1 - N_1^S$ and $N_2^C = N_2 - N_2^S$, can be determined as well. Thus, for given catalytic reaction rates ($R_{Tot}$, $R_1$, $R_2$), the corresponding turnover frequencies are well defined and simple to determine using formulae defined above.

The dispersion $D_1$ may be estimated using TEM, STEM, and other methods known to those skilled in the art. $D_1$ may also be estimated using the method described in U.S. patent application Ser. No. 11/695,943, entitled "Dispersion and Metal Particle Size Characterization of Nanocatalysts," filed Apr. 3, 2007, the entire contents of which are incorporated by reference herein. In this method, the estimate of $D_1$ is primarily based on the statistical raw moments of a length variable that describes the particles under investigation (e.g., diameter for spheres). Both the surface-averaged size $<d>_S$ and volume averaged size $<d>_V$ are defined in terms of the raw moments according to $<d>_S = <d^3>/<d^2>$ and $<d>_V = <d^4>/<d^3>$, respectively, where $<>$ denotes the arithmetic mean.

The total dispersion of the metal particles in the catalyst ($D_{Tot}$) may be estimated from chemisorption measurements. First, the adsorption ($\alpha$) of the catalyst is measured by chemisorption using techniques well known in the art. Second, the saturation coverage (θ) of the catalyst for a given probe molecule or adsorbate is determined either experimentally, e.g., using infrared spectroscopy or time-resolved X-ray photoelectron spectroscopy, as described in A. Baraldi, et al., "Real-time X-ray Photoelectron Spectroscopy of Surface Reactions," Surface Science Report 49, 169 (2003), or by computational modeling, e.g., using density functional theory combined with kinetic Monte Carlo simulations as described in E. Hansen and M. Neurock, "First-Principles Based Kinetic Simulations of Acetic Acid Temperature Programmed Reaction on Pd(111)," J. Phys. Chem. B, 105, 9218 (2001). The total dispersion of the catalyst ($D_{Tot}$) is determined from the relationship:

$$D_{Tot} = \frac{\alpha}{\theta}.$$

The correction factor ($y_2$) is determined by carrying out Monte Carlo simulations using the following equation that describes the influence of a known distribution $P_1$ and a variable distribution $P_2$ on the total dispersion ($D_{Tot}$):

$$D_{Tot} = \frac{<n_1^S> + \frac{m_2}{m_1}<n_2^S>}{<n_1> + \frac{m_2}{m_1}<n_2>},$$

where $<n_1^S>$ and $<n_2^S>$ are the mean numbers of surface atoms, $<n_1>$ and $<n_2>$ are the mean total number of atoms and $m_1$ and $m_2$ are the number of metal particles in $P_1$ and $P_2$, respectively. The lower bound for the size of particles in $P_2$ ($d_{low}$) can be determined as the value that satisfies the following equality:

$$\int_0^{d_{low}} P_1(x) dx = \xi,$$

where $\xi$ is typically 0.95 and $P_1(x)$ is the log-normal probability density function corresponding to $P_1$. Alternatively, the lower bound may be defined in terms of the surface-averaged diameter of $P_1$ (i.e., $<d_1>_S = <d_1^3>/<d_1^2>$), e.g., $d_{low} = \nu <d_1>_S$, where $\nu$ is a number greater than 1, typically around 3. The upper bound $d_{high}$ must be greater than the lower bound.

When the above-described Monte Carlo simulations are carried out using increasing values of $m_1$ and $m_2$, the influence of distributions $P_1$ and $P_2$ on the total dispersion ($D_{Tot}$) remains linear after a certain value of $m_1$ according to the following equation:

$$\frac{N_2}{N_{Tot}} = y_2 \times \left(\frac{D_1 - D_{Tot}}{D_1}\right).$$

At this point, the correction factor ($y_2$) can be calculated using the formula for the total dispersion ($D_{Tot}$) shown above.

Figure 5:
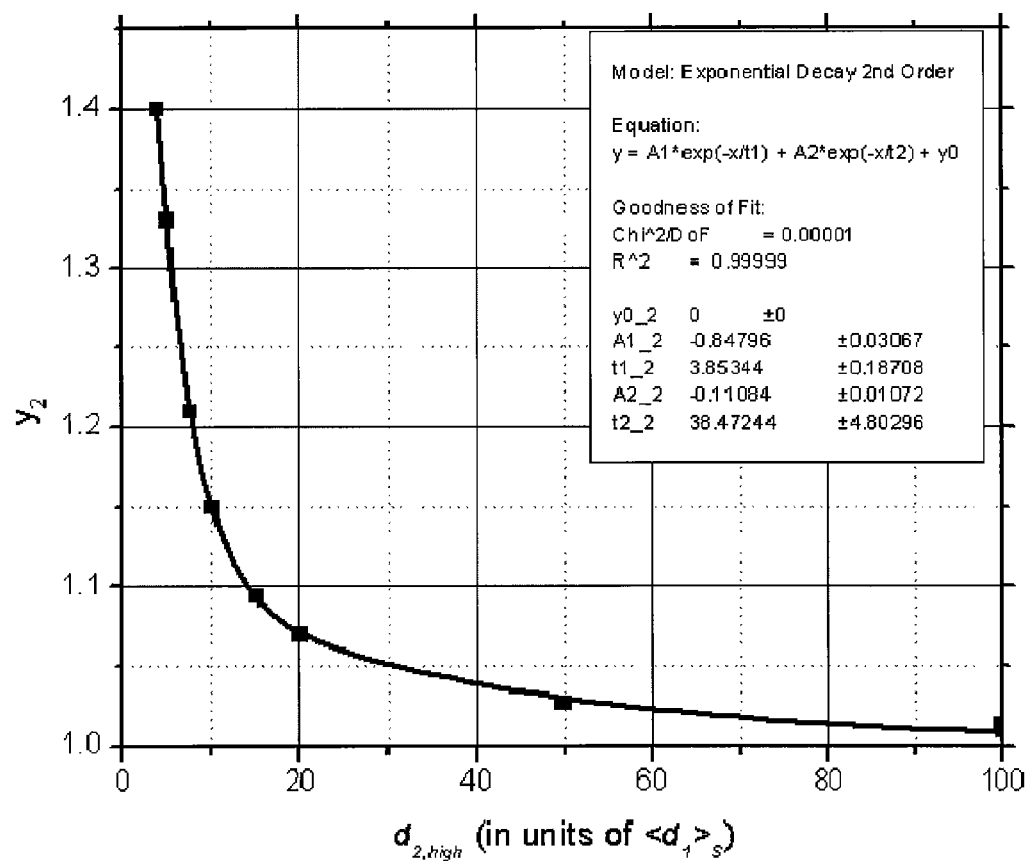
FIG. 5 illustrates the variation of a correction factor as a function of an estimated upper bound for the size range of large metal particles in a catalyst.

FIG. 5 illustrates the variation of the correction factor ($y_2$) as a function of the upper bound ($d_{high}$) in the case of an actual supported platinum catalyst, where $d_{low}=3<d_1>_S$, $<d_1>_S=23$ nm, and $<d_1>_V=26$ nm. $<d_1>_V$ (i.e., $<d_1>_V=<d_1^4>/<d_1^3>$) represents the volume-averaged diameter of the $P_1$ metal particles. FIG. 5 confirms that, for very large values of $d_{high}$, the number of atoms in the $P_2$ metal particles may be approximated with $y_2=1$ or according to the formula:

$$\frac{N_2}{N_{Tot}} = \frac{D_1 - D_{Tot}}{D_1}.$$

Figure 6:
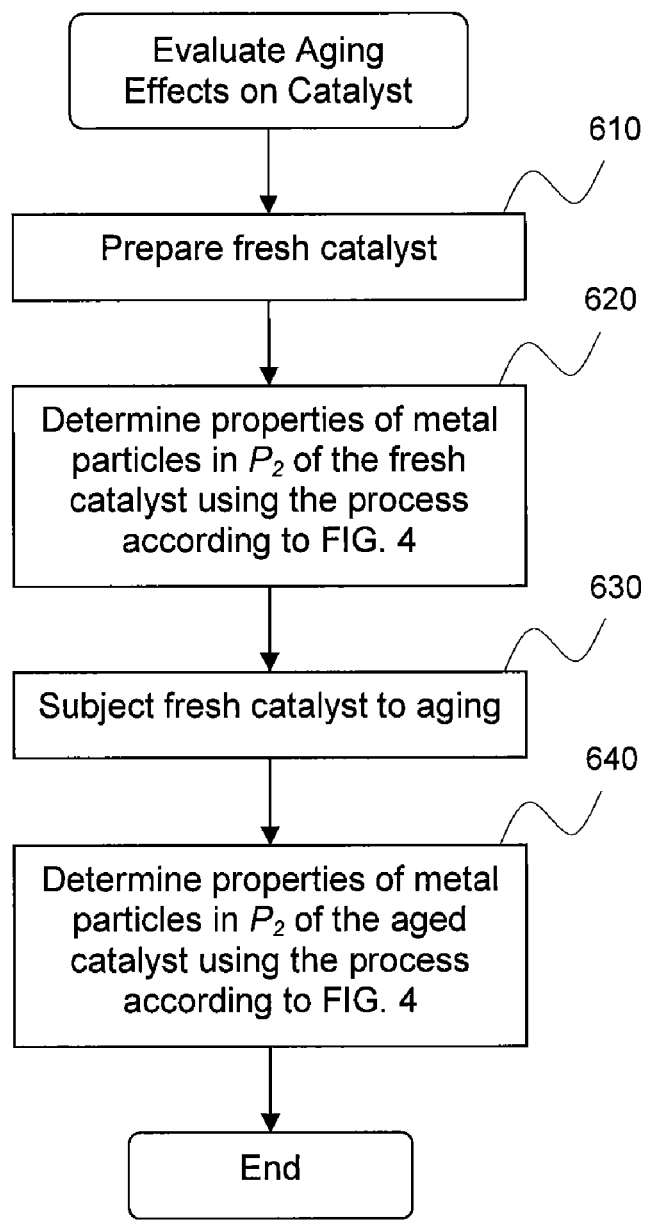
FIG. 6 is a flow diagram illustrating the steps carried out to evaluate the effects of aging on a catalyst using the process according to FIG. 4.

FIG. 6 is a flow diagram illustrating the steps carried out to evaluate the effects of aging on a catalyst using the process according to FIG. 4. In step 610, a fresh catalyst is prepared. In step 620, the fraction of $P_2$ metal particles in the fresh catalyst is determined from the size measurements carried out using the process according to FIG. 4. In step 630, the fresh catalyst is subjected to aging conditions, e.g., exposed to high temperatures under a given atmosphere of gas for an extended period of time. In step 640, the fraction of metal particles in $P_2$ in the aged catalyst is determined from the size measurements carried out using the process according to FIG. 4. A disproportionately high degree of sintering will give rise to an increased fraction of metal atoms in $P_2$ as determined in step 640 relative to the value determined in step 620. Different catalysts may be evaluated using this method to determine which develop the least amount of wasted metal under given aging conditions.

Figure 7:
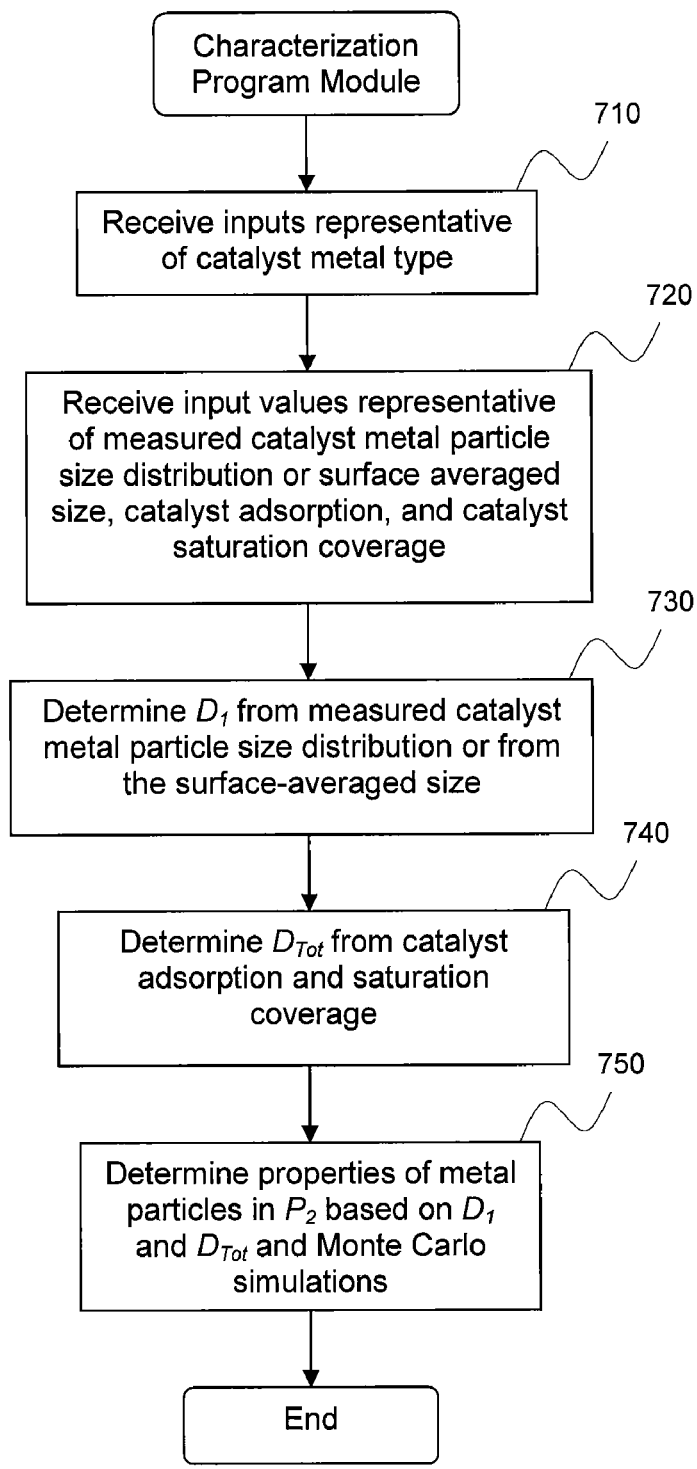
FIG. 7 is a flow diagram illustrating the steps carried out by a computer system in accordance with a computer program module for characterizing a physical property of a catalyst.

FIG. 7 is a flow diagram illustrating the steps carried out by a computer system in accordance with a computer program module for characterizing a physical property of a catalyst. In step 710, the computer system receives inputs from a user. The inputs identify the metal species (one or more) of the catalyst. In step 720, the computer system receives further inputs, such as those representative of measured catalyst metal particle sizes, e.g., the surface-averaged diameter $<d_1>_S$ of the $P_1$ metal particles and measured α and θ. Then, the computer system calculates $D_1$ from $<d_1>_S$ in step 730, and a second dispersion value ($D_{Tot}$) from α and the θ in step 740. In step 750, the atomic fraction of metal atoms in $P_2$ is determined using the relationship:

$$\frac{N_2}{N_{Tot}} = \frac{D_1 - D_{Tot}}{D_1},$$

where the dispersion $D_2$ of the metal particles in $P_2$ is assumed to be zero or negligible compared to $D_1$. The atomic fraction of metal atoms in $P_1$ follows directly from $$\frac{N_1}{N_{Tot}} = 1 - \frac{N_2}{N_{Tot}}.$$

In an alternative embodiment where $D_2$ is not assumed to be negligible compared to $D_1$, the correction factor $y_2$ is input and, in step 750, the atomic fraction of metal atoms in $P_2$ is determined using the relationship:

$$\frac{N_2}{N_{Tot}} = y_2 \times \left(\frac{D_1 - D_{Tot}}{D_1}\right).$$

Again, the atomic fraction of metal atoms in $P_1$ follows directly from $$\frac{N_1}{N_{Tot}} = 1 - \frac{N_2}{N_{Tot}}.$$

When $y_2$ has been determined, the dispersion for $P_2$ is calculated by $$D_2 = \left(1 - \frac{1}{y_2}\right) \times D_1.$$

The ratio of the number of surface atoms of the $P_2$ metal particles, to the total number of surface metal atoms in the catalyst is determined by:

$$\frac{N_2^S}{N_{Tot}^S} = (y_2 - 1) \times \left(\frac{D_1}{D_{Tot}} - 1\right).$$

The corresponding fraction of metal surface atoms in $P_1$ is $$\frac{N_1^S}{N_{Tot}^S} = 1 - \frac{N_2^S}{N_{Tot}^S}.$$

Thereafter, it is straightforward to calculate $$N_{Tot}^S = D_{Tot} \times N_{Tot}, \quad N_2^S = N_{Tot}^S \times (y_2 - 1) \times \left(\frac{D_1}{D_{Tot}} - 1\right)$$

and $N_1^S = N_{Tot}^S - N_2^S$. Similarly, $N_2$ and $N_1$ are simply calculated by $$N_2 = N_{Tot} \times y_2 \times \left(\frac{D_1 - D_{Tot}}{D_1}\right)$$

and $N_1 = N_{Tot} - N_2$. Having determined all dependent variables, the number of core atoms: $N_{Tot}^C = N_{Tot} - N_{Tot}^S$, $N_1^C = N_1 - N_1^S$ and $N_2^C = N_2 - N_2^S$, can be determined. Thus, for given catalytic reaction rates ($R_{Tot}$, $R_1$, $R_2$), the corresponding turnover frequencies are well defined and simple to determine according to: $TOF_{Tot} = R_{Tot}/N_{Tot}^S$, $TOF_1 = R_1/N_1^S$ and $TOF_2 = R_2/N_2^S$, respectively.

While particular embodiments according to the invention have been illustrated and described above, those skilled in the art understand that the invention can take a variety of forms and embodiments within the scope of the appended claims.

What is claimed is:

1. A catalyst characterization method comprising the steps of:
   providing a catalyst having a small metal particle distribution $P_1$ and a large metal particle distribution $P_2$;
   estimating dispersion $D_1$ of the metal atoms in $P_1$;
   estimating a total dispersion $D_{Tot}$ of the catalyst; and
   determining the amount of metal atoms in $P_2$ based on $D_1$ and $D_{Tot}$, wherein the ratio of metal atoms in $P_2$ ($N_2$) to the total number of atoms in the catalyst ($N_{Tot}$) is determined from the relationship:

$$\frac{N_2}{N_{Tot}} = \frac{D_1 - D_{Tot}}{D_1}.$$

2. The method according to claim 1, wherein the step of estimating the dispersion $D_1$ of the metal particles in $P_1$ comprises the steps of:
   obtaining TEM images of a representative sample of the catalyst;
   determining the statistical raw moments of a length variable that describes the metal particles in $P_1$ from the TEM images; and
   estimating $D_1$ based on the statistical raw moments of the length variable.

3. The method according to claim 2, wherein a dispersion $D_2$ of the metal particles in $P_2$ is determined from the relationship:

$$D_2 = \left(1 - \frac{1}{y_2}\right) \times D_1.$$

4. The method according to claim 1, further comprising the steps of:
   determining the total number of metal atoms in the catalyst ($N_{Tot}$); and
   determining $N_2$ and $N_1$ using:

$$N_2 = N_{Tot} \times y_2 \times \left(\frac{D_1 - D_{Tot}}{D_1}\right)$$

and $N_1 = N_{Tot} - N_2$.

5. The method according to claim 4, further comprising the step of determining $N_{Tot}^S$, $N_2^S$, and $N_1^S$ using: $N_{Tot}^S = D_{Tot} \times N_{Tot}$, $$N_2^S = N_{Tot}^S \times (y_2 - 1) \times \left(\frac{D_1}{D_{Tot}} - 1\right),$$

and $N_1^S = N_{Tot}^S - N_2^S$.

6. The method according to claim 5, further comprising the step of determining turnover frequencies for given catalytic reaction rates $R_{Tot}$, $R_1$, and $R_2$ using: $TOF_{Tot} = R_{Tot}/N_{Tot}^S$, $TOF_1 = R_1/N_1^S$ and $TOF_2 = R_2/N_2^S$, respectively.

7. The method according to claim 5, further comprising the step of determining the numbers of core atoms $N_{Tot}^C$, $N_1^C$, and $N_2^C$ using: $N_{Tot}^C = N_{Tot} - N_{Tot}^S$, $N_1^C = N_1 - N_1^S$ and $N_2^C = N_2 - N_2^S$.

8. The method according to claim 1, wherein the total dispersion of the catalyst sample ($D_{Tot}$) is estimated through chemisorption measurements carried out on the catalyst sample.

9. The method according to claim 8, wherein the total dispersion of the catalyst sample ($D_{Tot}$) is estimated using the following relationship:

$$D_{Tot} = \frac{\alpha}{\theta},$$

where $\alpha$ is adsorption of the catalyst and $\theta$ is saturation coverage of the catalyst sample.

10. A method for evaluating effects of aging on a catalyst, comprising the steps of:
preparing a fresh catalyst, the fresh catalyst having a small metal particle distribution $P_1$ and a large metal particle distribution $P_2$;
determining an amount of metal atoms in $P_2$ based on size measurements of metal particles in the fresh catalyst and chemisorption measurements performed on the fresh catalyst;
subjecting the fresh catalyst to aging; and
determining an amount of metal atoms in $P_2$ after aging, based on size measurements of metal particles in the aged catalyst and chemisorption measurements performed on the aged catalyst,
wherein each step of determining includes the steps of:
estimating a dispersion $D_1$ of metal particles in $P_1$ based on the size measurements of the metal particles in $P_1$;
estimating a total dispersion $D_{Tot}$ of the catalyst based on the chemisorption measurements performed on the catalyst; and
determining the number of metal atoms in $P_2$ of the catalyst based on $D_1$ and $D_{Tot}$, wherein the ratio of metal atoms in $P_2$ ($N_2$) to the total number of atoms in the catalyst ($N_{Tot}$) is determined from the relationship:

$$\frac{N_2}{N_{Tot}} = \frac{D_1 - D_{Tot}}{D_1}.$$

11. A computer-readable medium having stored thereon instructions to be executed in a computer system to determine a physical property of a catalyst having a small metal particle distribution $P_1$ and a large metal particle distribution $P_2$, the instructions causing the computer system to carry out the steps of:
determining a first dispersion value ($D_1$) representative of metal particles in $P_1$;
determining a second dispersion value ($D_{Tot}$) representative of all metal particles in the catalyst; and
determining an amount of metal atoms in $P_2$ based on $D_1$ and $D_{Tot}$, wherein the ratio of metal atoms in $P_2$ ($N_2$) to the total number of atoms in the catalyst ($N_{Tot}$) is determined from the relationship:

$$\frac{N_2}{N_{Tot}} = \frac{D_1 - D_{Tot}}{D_1}.$$

12. The computer-readable medium according to claim 11, wherein the dispersion value $D_1$ is determined from measured sizes of the metal particles in $P_1$.

13. The computer-readable medium according to claim 11, further comprising the step of receiving inputs specifying a first input value representative of a total adsorption ($\alpha$) of the catalyst and a second input value representative of a saturation coverage ($\theta$) of the catalyst, wherein the second dispersion value ($D_{Tot}$) is determined from the relationship:

$$D_{Tot} = \frac{\alpha}{\theta}.$$

* * * * *